US007450278B2

(12) United States Patent
Nakazawa

(10) Patent No.: US 7,450,278 B2
(45) Date of Patent: Nov. 11, 2008

(54) CALIBRATION METHOD, IMAGE FORMING SYSTEM, IMAGE FORMING APPARATUS AND CALIBRATION PROGRAM

(75) Inventor: Toshihiko Nakazawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 172 days.

(21) Appl. No.: 11/410,332

(22) Filed: Apr. 24, 2006

(65) Prior Publication Data

US 2007/0177168 A1 Aug. 2, 2007

(30) Foreign Application Priority Data

Jan. 27, 2006 (JP) ............................ 2006-018738

(51) Int. Cl.
*H04N 1/46* (2006.01)

(52) U.S. Cl. ....................... 358/504; 358/406; 358/487; 399/72

(58) Field of Classification Search .................. 358/1.4, 358/504, 1.18, 1.9, 3.1, 406, 487; 399/49, 399/72
See application file for complete search history.

(56) References Cited

U.S. PATENT DOCUMENTS 6,141,120 A * 10/2000 Falk ........................... 358/504
6,563,524 B1 * 5/2003 Regimbal et al. ............. 399/49
6,657,739 B1 * 12/2003 Grant et al. ................ 358/1.18
6,906,828 B2 * 6/2005 VanDuyn et al. ............ 358/504
6,965,462 B1 * 11/2005 Henderson et al. .......... 358/504
7,050,196 B1 * 5/2006 Piatt et al. .................... 358/1.9
7,142,332 B2 * 11/2006 Degani et al. ................ 358/3.1
2002/0021321 A1 * 2/2002 Nakajima et al. ........... 358/504
2002/0054383 A1 * 5/2002 Sato et al. ................... 358/504
2005/0207768 A1 * 9/2005 Suzuki ........................ 399/49

FOREIGN PATENT DOCUMENTS

JP 07-056409 A 3/1995

* cited by examiner

*Primary Examiner*—Twyler L. Haskins
*Assistant Examiner*—Nicholas C Pachol
(74) *Attorney, Agent, or Firm*—Frishauf, Holtz, Goodman & Chick, P.C.

(57) ABSTRACT

A calibration method having the steps of: forming a test image on a sheet; reading the test image on the sheet; and determining correction data to converge data of the test image onto target data, based on information read in the reading step; wherein in cases where in the step of forming the test image a first test image is formed on a face of a transparent sheet as the test image, in the step of reading the test image the first test image is read from a first side of a face to be read which is opposite to the face of the transparent sheet where the first test image is formed.

18 Claims, 18 Drawing Sheets

CALIBRATION METHOD, IMAGE FORMING SYSTEM, IMAGE FORMING APPARATUS AND CALIBRATION PROGRAM

CROSS REFERENCE TO RELATED APPLICATION(S)

The present application claims a priority under the Paris Convention of Japanese Patent Application No. 2006-018738 filed with Japan Patent Office on Jan. 27, 2006, and is entitled to the benefit thereof for a basis of correction of an incorrect translation.

BACKGROUND OF THE INVENTION

1. Field of the Invention

The present invention relates to a calibration method for correcting the image density and color tone, an image forming system, an image forming apparatus, and a calibration program for calibration operation.

2. Description of Related Art

A great number of image forming apparatuses based on electrophotographic technology such as copiers, printers and facsimiles have been introduced in offices. The image forming apparatus is required to reproduce a high-quality image having uniform glossiness. The image formed by electrophotographic technology is formed by toner particles, and roughened structures are produced on the image surface, with the result that uniform glossiness is not likely to occur. To improve this point, it will be possible to work out a heat fixing step and fixing a toner image on a sheet of paper. The image formed by electrophotographic technology, however, contains a toner-rich area and a toner-poor area. Working out of a fixing step cannot succeed in complete elimination of the roughened structure of the image face. Further, the toner-rich area rises to form a relief. Such a problem cannot be solved by only working out a fixing step.

In an effort to solve this problem, Unexamined Japanese Patent Application Publication No. 7-56409 discloses a technique wherein a mirror image is transferred and fixed onto a transparent sheet, and a light reflecting member is bonded to the toner image carrying face of the transparent sheet. According to this technique, the toner image is sandwiched between the transparent sheet and light reflecting member. The face opposite to the toner image carrying face of the transparent sheet becomes the image front. To be more specific, the image is viewed through the transparent sheet. Since the transparent sheet has a smooth face, an image having uniform glossiness can be provided by electrophotographic technology as a matter of form.

Incidentally, in the image forming apparatus based on electrophotographic technology, especially in the color image forming apparatus, in order to ensure adequate density, color tone and lightness of the output image, calibration is performed in such a way that the measured data (e.g. calorimetric data) is converged on the target data (e.g. target color data) so that the output image is read by a reading section such as a scanner densitometer and calorimeter and an ideal output value is obtained. According to the conventional calibration, an image is formed on white paper. The face where this test image is formed is used as a face to be read, and the test image is read by the reading section. However, as in the aforementioned Patent Document 1, when a mirror image is formed on the transparent sheet and is observed from the back, even if the face of the transparent sheet with the image formed thereon is read by the reading section such as a scanner according to the conventional calibration method, the measurement data with consideration given to the properties of the transparent sheet cannot be obtained. Thus, density or color tone cannot be adjusted properly.

In an image forming apparatus capable of forming a normal image on the standard paper or an mirror image on the transparent sheet by user's mode selection, when calibration of density and color tone is carried out, it is necessary to distinguish between the calibration to be performed for forming a normal image on the standard paper, or the calibration to be performed for forming an mirror image on the transparent sheet. Otherwise, a wrong correction data may be used for image formation, and an image characterized by proper density and color tone cannot be obtained.

Thus, one of the objects of the present invention is to provide calibration operation with consideration given to the properties of the transparent sheet. Another object of the present invention is to provide proper calibration operation in an image forming apparatus capable of forming a normal image on the standard paper and a mirror image on the transparent sheet, wherein a clear distinction can be made between calibration for the normal image or calibration for the mirror image.

SUMMARY

To achieve at least one of the above-mentioned objects, a calibration method reflecting one aspect of the present invention includes the steps of:

forming a test image on a sheet;

reading the test image on the sheet; and determining correction data to converge data of the test image onto target data, based on information read in the reading step;

wherein in a case where in the forming step a first test image is formed on a face of a transparent sheet as the test image, in the reading step the first test image is read from a first side of a face to be read which is opposite to the face of the transparent sheet where the first test image is formed.

A calibration method reflecting another aspect of the present invention includes the steps of:

determining a type of calibration to specify a normal image calibration or a mirror image calibration;

forming a test image on a sheet;

reading, when the normal image calibration is determined in the determining step, the test image from a first side of a face to be read which is the same face of the sheet where the test image is formed, and reading, when the mirror image calibration is determined in the determining step, the test image from a second side of a face to be read which is an opposite face of the sheet where the test image is formed; and determining correction data to converge data of the test image onto target data, based on the information read in the reading step.

An image forming system reflecting another aspect of the present invention to execute calibration operation such that data of a test image formed on a sheet are converged onto target data, the image forming system including:

an image forming apparatus to form a test image on the sheet;

a reading apparatus, connected to the image forming apparatus, to read the test image formed on the sheet; and a control section to control the image forming apparatus to form on the sheet an identification mark to specify which face of the sheet, on which the test image having been formed, is a face to be read by the reading apparatus.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

Figure 1:
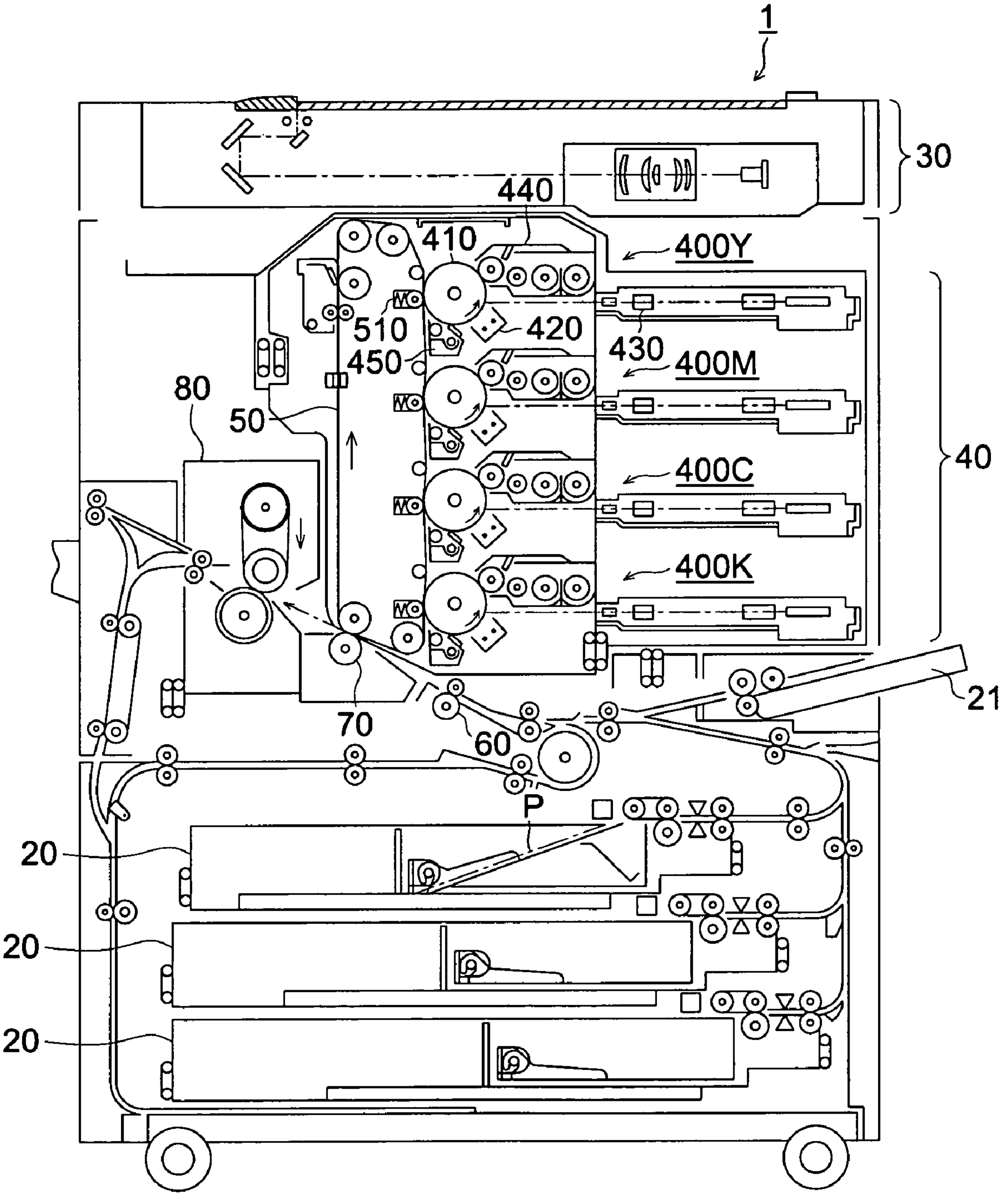
FIG. 1 is a central cross sectional view of the internal structure of an image forming apparatus.

FIG. 1 is a central cross sectional view of the internal structure of an image forming apparatus.

A plurality of recording material storage sections 20 is arranged on the lower portion of the image forming apparatus 1. An image forming section 40 and intermediate transfer belt 50 are arranged above the recording material storage section 20, and a reading section 30 is installed on the upper portion of the apparatus.

The recording material storage section 20 can be pulled out to the front of the apparatus (front side of the sheet face in FIG. 1). The standard sheets such as white paper are stored as recording materials in a plurality of recording material storage sections 20 after having been sorted according to the size. The manual feed section 21 has special sheet such as OHP sheets set therein. The transparent sheets Na to be described later are also set in the manual feed section 21.

The image forming section 40 contains four image forming engines 400Y, 400M, 400C and 400K for forming toner images of colors Y, M, C and K. The image forming engines 400Y, 400M, 400C and 400K are arranged in this order in a line from top to bottom, each having one and the same configuration. The yellow-color image forming engine 400Y is taken as an example to explain the configuration. The image forming engine 400Y has a photoreceptor 410 rotating in the counterclockwise direction, a scorotron charging device 420, an exposure apparatus 430 and a developing device 440.

The cleaning section 450 is provided with containing an area opposite to the lowermost part of the photoreceptor 410.

The intermediate transfer belt 50 located at the center of the apparatus main-body is an endless belt having a predetermined volume resistivity. The primary transfer electrode 510, with the intermediate transfer belt 50 located in-between, is arranged opposite to the photoreceptor 410.

The following describes the process of forming a color image:

The photoreceptor 410 is driven by the main motor (not illustrated) and is negatively charged by the discharge from a scorotron charging device 420 (−800 V in the present embodiment). Then optical writing is applied to the photoreceptor 410 according to the image information by the exposure apparatus 430, and an electrostatic latent image is formed. When electrostatic latent image having been formed passes through the developing device 440, the toner negatively charged inside the developing device is deposited on the portion of a latent image by application of negative development bias, with the result that a toner image is formed on the photoreceptor 410. The toner image having been formed is transferred onto the intermediate transfer belt 50 pressed against the photoreceptor 410. After transfer, the toner remaining on the photoreceptor 410 is removed by the cleaning section 450. The toner images formed by the image forming engine 400Y, 400M, 400C and 400K are transferred on the intermediate transfer belt 50 in the form superimposed one on top of another, so that a color image is formed on the intermediate transfer belt 50. The recording materials P are ejected one by one by the recording material storage section 20, and are fed to the registration roller 60. After the leading edge of the recording material P has been aligned by the registration roller 60, the recording material P is fed by the registration roller 60 at a timing when the position of the image is aligned with that of the toner image on the intermediate transfer belt 50. The recording material P fed by the registration roller 60 is guided by a guide plate and is fed to the transfer nip section formed by the intermediate transfer belt 50 and transfer section 70. The transfer section 70 made of a roller presses the recording material P against the intermediate transfer belt 50. When the bias (+500 V) having polarity opposite to that of the toner is applied to the transfer section 70, the toner image on the intermediate transfer belt 50 is transferred onto the recording material P by the static electricity. Electric charge on the recording material P is neutralized by the separation apparatus including discharging needles (not illustrated). The recording material P is separated from the intermediate transfer belt 50 and is fed to the fixing section 80 made up of a pair of heating roller and pressure roller. Thus, the toner image is fixed onto the recording material P, and the recording material P with the image formed thereon is ejected out of the apparatus.

Figure 2:
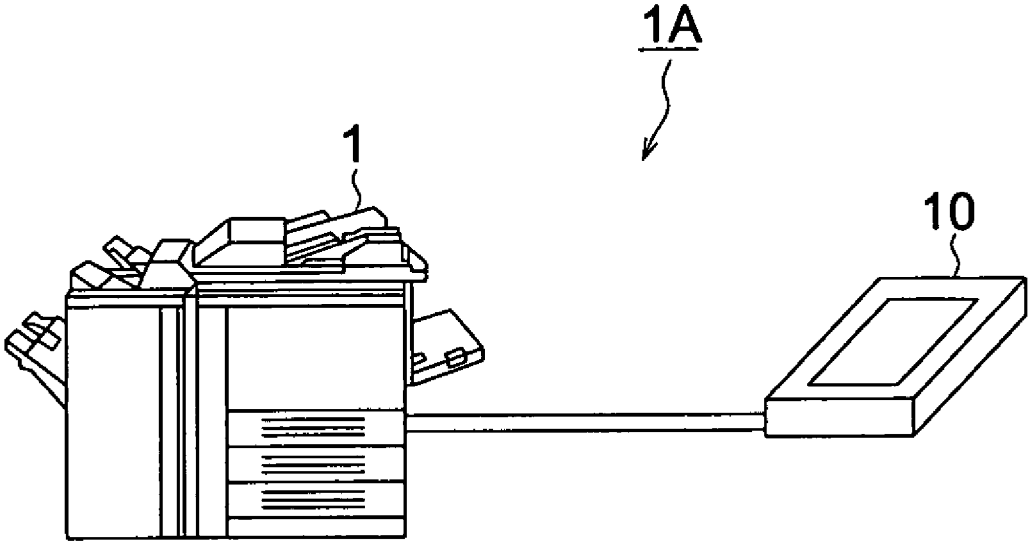
FIG. 2 is an explanatory diagram representing the overall configuration of an image forming system.

The density and color tone of the color image outputted from the image forming apparatus 1 differ according to the difference in reproducibility depending on the image quality mode to be used and the type of the transfer sheet, fluctuations in characteristics depending on the status of apparatus usage and operation environment, instrumental difference, and user's preference. This requires individual adjustment of the density and color tone. To ensure ideal density and color tone, the test chart (test image) is outputted on paper, and is read by the reading device such as a scanner. The process of calibration is applied to the image forming apparatus 1, wherein the calorimetric data is converged on the target color data. Calibration in the image forming apparatus 1 is carried out when the test chart is read by the reading section 30. In the image forming system 1A showed in FIG. 2, the test chart is read by the densitometer or calorimeter (reading apparatus) 10 connected to the image forming apparatus 1. The calibration method implemented in the image forming apparatus 1 and image forming system 1A will be described later.

Figure 3:
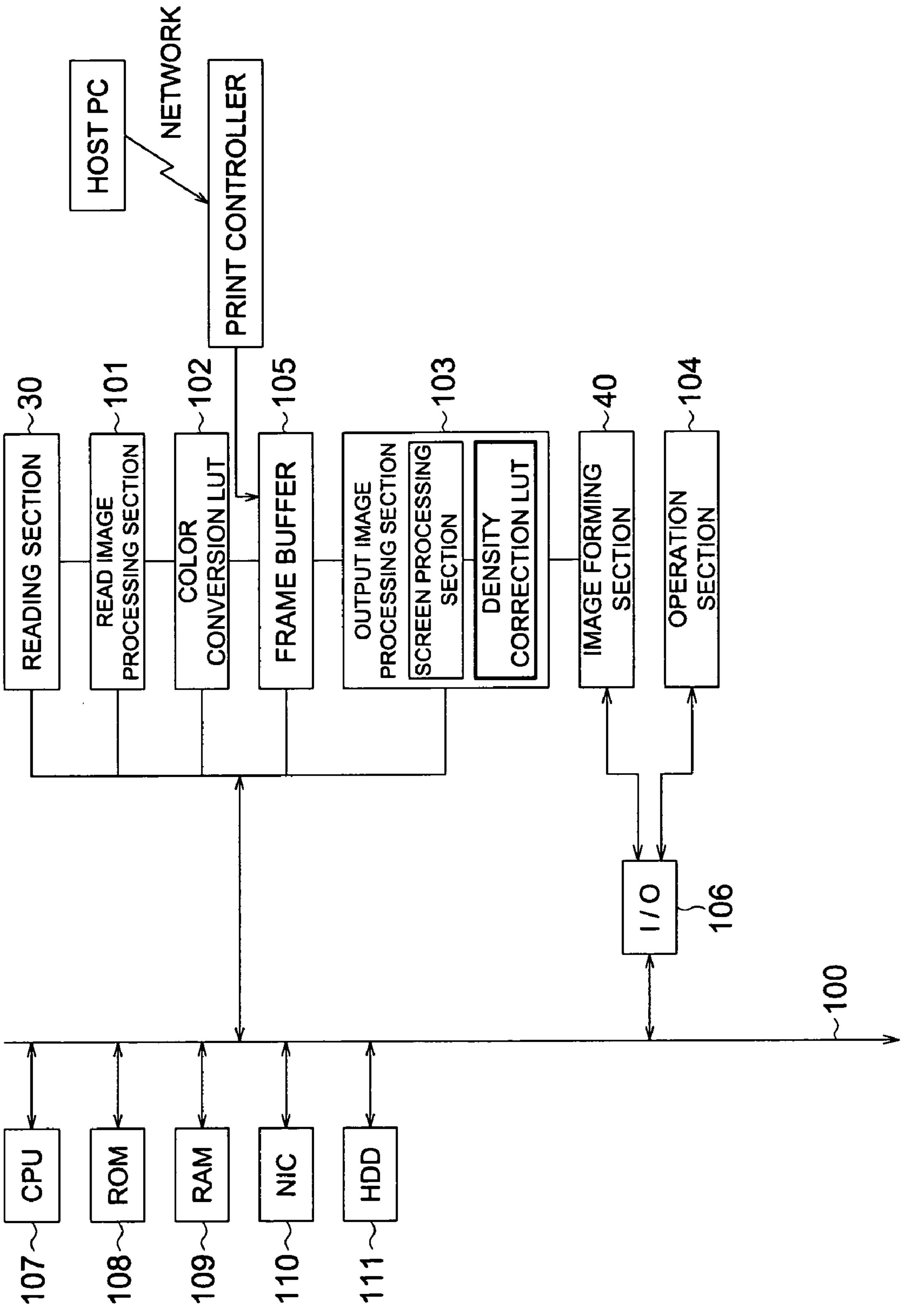
FIG. 3 is a block diagram representing the control system of the image forming apparatus.

FIG. 3 is a block diagram representing the control system of the image forming apparatus.

The reading section 30 optically reads the document image and converts it into the electrical signal. Then it generates the image data having 10-bit luminance information per pixel for each of the R, G and B.

The read image processing section 101 applies the processes of input masking, gradation conversion and output masking to the image data having been inputted. The color conversion lookup table (color conversion LUT) 102 is a 3D table for converting the 10-bit data for each of the R, G and B to the 8-bit data for each of the C, M, Y and Bk. Referring to the density correction LUT, the output image processing section 103 applies the process of screening such as dot processing to the image data outputted from the color conversion LUT 102, and corrects the gradation reproducibility of the image forming section. This arrangement provides an image having excellent gradation Based on the CMYK data to be inputted, the image forming section 40 forms an image on the recording material (sheet).

The frame buffer 105 is a memory (e.g. SDRAM) having a predetermined storage capacity. It stores the image data outputted from the reading section 30 by a CPU (Central Processing Unit) 107, and the image data received from outside the apparatus. In addition SDARM, a semiconducting memory such as DRAM and hard disk can be used as the frame buffer 105

The I/O 106 relays the control signal sent via the system bus 100, to the reading section 30 and image forming section 40. It also relays the status of the reading section 30 and image forming section 40, and sensor signals to the system bus 100.

The CPU 107 working as a control function controls the operations of the entire image forming apparatus 1, and is connected to the ROM (Read Only Memory) and RAM (Random Access Memory) via the system bus 100. The CPU 107 reads various control programs from the ROM 108. It expands them on the RAM 109, and controls the operations of each section. Further, the CPU 107 implements various forms of processing in response to the program displayed on the RAM 109, and stores the result of processing into the RAM 11. At the same time, the CPU 107 displays it on the display of the operation section 104. The result of processing stored in the RAM 109 is stored in a predetermined storage destination.

The ROM 108 stores the program and data in advance. The recording medium is made up of magnetic and optical recording mediums and semiconductor memory. The calibration program to be described later is stored in the ROM 108.

The RAM 109 serves as a work area for temporarily storing the data processed by various control programs implemented by the CPU 107.

The network interface card (NIC) 110 provides an interface between the system bus and network. The hard disk drive (HDD) 111 is connected with the system bus 106 via the SCS1 controller. It has a storage capacity of 4.2 GB in the case of a 3.5-inch card, for example.

When a color image is formed by the image forming apparatus 1, a document image is read by the reading section 30, and RGB image data is generated. The RGB image data having been generated is inputted into the color conversion LUT 102 via the read image processing section 101. After having been converted into the CMYK image data, the data passes further through the output image processing section 103, and is send to the image forming section 40. The images are formed in the order of C, M, Y and K, whereby a color image is formed on the recording material.

The following describes the calibration operation:

The output density characteristics of the image forming apparatus 1 are generally different from the target output density characteristics in many respects, when they are compared. Thus, in order to adjust the output density characteristics of the image forming apparatus 1 to the target output density characteristics, the density correction LUT having conversion characteristics is obtained from the calibration operation.

Figure 4:
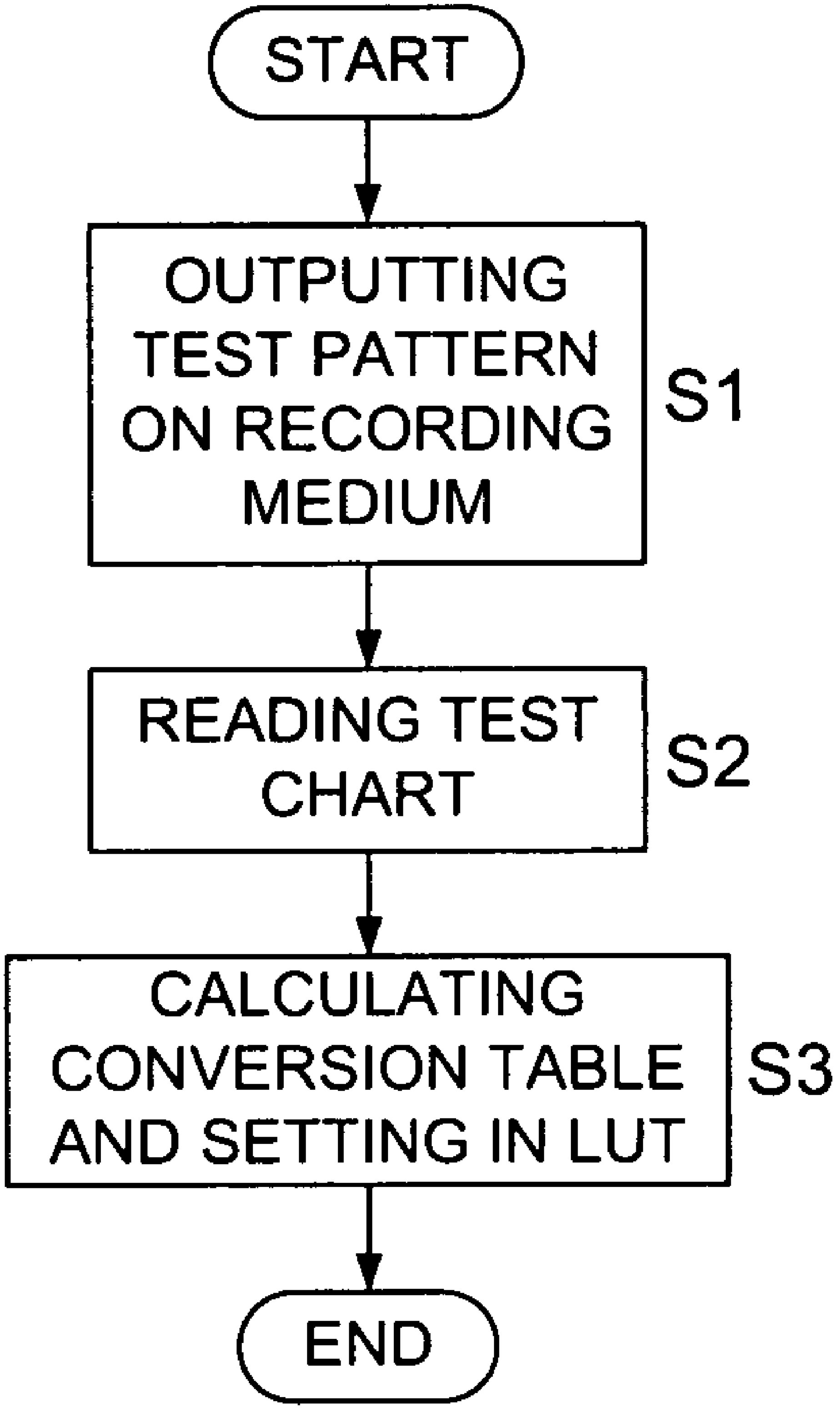
FIG. 4 is a flow chart showing the calibration operation.

FIG. 4 is a flow chart showing the calibration operation.

Figure 5:
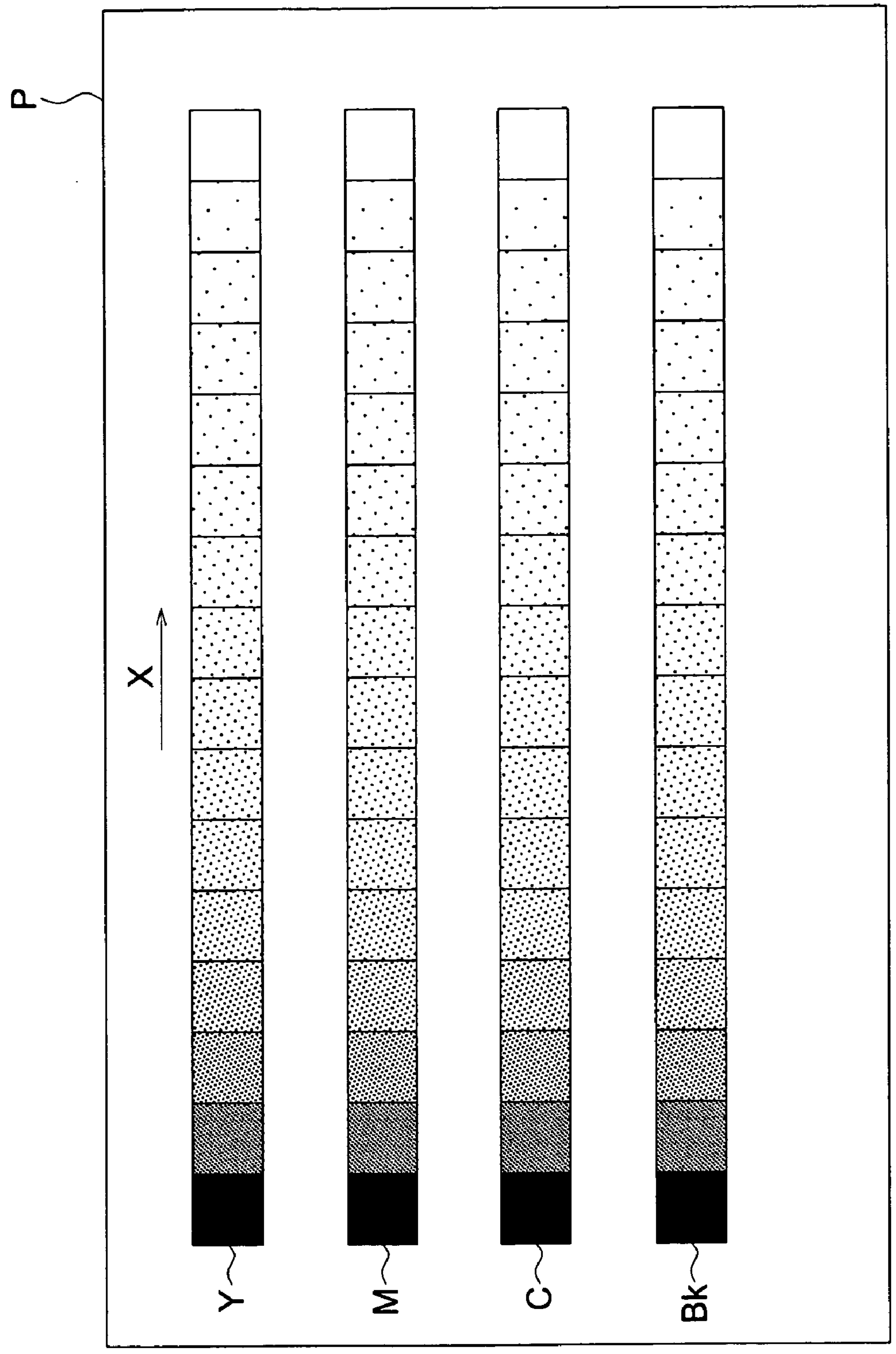
FIG. 5 is an explanatory diagram representing the test pattern used in calculation operation.

The calibration operation shown in FIG. 4 is performed by the CPU 107 executing the program stored in the ROM 108. Calibration is performed using a test chart (FIG. 5) wherein a single-color density patch (the patch density is more reduced as one goes further in the X direction in FIG. 5) of 16 gradations within the range from 0 through 100% for each of Y, M, C and Bk is printed in one page. This test chart is outputted on the recording material P by the image forming apparatus 1 (S1 in FIG. 4). Upon completion of the output of the test chart, a message appears on the display of the operation section 104, prompting the test chart to be set on the reading section 30 (calorimeter 10 in the image forming system 1A shown in FIG. 2). The operator sets the test chart on the reading section 30, and presses a predetermined button. This procedure allows the test chart to be read in S2 (S2). The output density characteristics of the image forming apparatus 1 are calculated by computation for interpolation from the data wherein 16-gradation output density has been read for each color component. The conversion table for calibration is computed for each color component, and the result is stored in the RAM of the density correction LUT (S3).

As described above, the conversion table for calibration is set and is applied to image data conversion, whereby the calorimetric data is converged on the target color data. This produces a color image characterized by adequate density and color tone.

Incidentally, the image formed by electrophotographic technology is formed by toner particles. This causes roughened structures to be produced on the image surface, with the result that uniform glossiness cannot easily be obtained. This problem is solved by a mirror image formed on the transparent sheet. The details of this solution will be described below. In the first place, the transparent sheet Na will be described.

Figure 6:
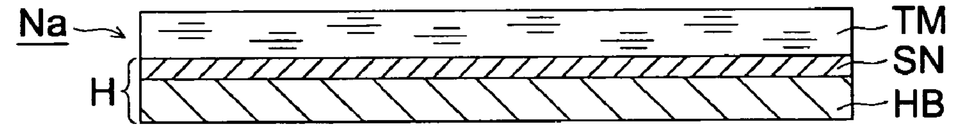
FIG. 6 is an explanatory diagram representing an example of the transparent sheet Na for forming a mirror image.

FIG. 6 is an explanatory diagram representing an example of the transparent sheet Na for forming a mirror image.

The transparent sheet Na shown in FIG. 6 is made of a transparent substrate TM, adhesive or agglutinant layer SN and light reflecting substrate HB. A light reflecting member H is formed of the adhesive or agglutinant layer SN and light-reflecting substrate HB, and the adhesive or agglutinant layer SN is secured on the light-reflecting substrate HB.

A PET (polyethylene terephthalate) film is preferred as the material of transparent substrate TM. The transparent substrate is preferably 50 through 500 μm thick. If it is thinner than 50 μm, the roughened structure resulting from toner image may appear on the surface of the transparent substrate TM. If it is thicker than 500 μm, the satisfactory formation of an image may not result.

When the electrophotographic technology is used for image formation, the surface resistivity of the transparent substrate TM is preferably within the range from $10^7$ Ω/□ through $10^{12}$ Ω/□. If the surface resistivity is lower than $10^7$ Ω/□, satisfactory transfer may not be carried out, with the result that image quality may be poor. If it is higher than $10^{12}$ Ω/□, an unwanted electrostatic charge will occur and this may cause a trouble in conveyance. Thus, to ensure adequate resistivity of the transparent substrate TM, the transparent substrate TM is preferably provided with an antistatic layer.

The adhesive or agglutinant layer SN is formed by coating an adhesive or agglutinant on the light-reflecting substrate HB in advance. Thus, unlike the case of a normal laminate, the adhesive or agglutinant layer SN is fixed on the side of the light-reflecting substrate HB. For the recording medium for image formation, a high-quality image can be easily formed on the transparent substrate TM, without being affected by the adhesive or agglutinant layer. At the same time, light reflecting member H is separated from the back of the image formed face, and can be bonded on the image formed side. The known agent such as a solvent based acryl agglutinant or emulsion agglutinant can be used.

The light-reflecting substrate HB is a white, milky white or silvery reflective sheet. Coated paper for printing, resin coated paper and resin film are preferably used. Instead of bonding the reflective sheet, coating of a white ink is also acceptable.

Figure 7:
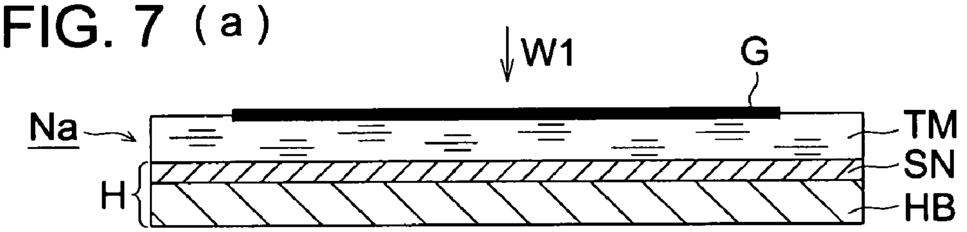
FIGS. 7(*a*) through (*d*) are explanatory diagrams representing the mode of forming an image on the transparent sheet Na.
Figure 7:
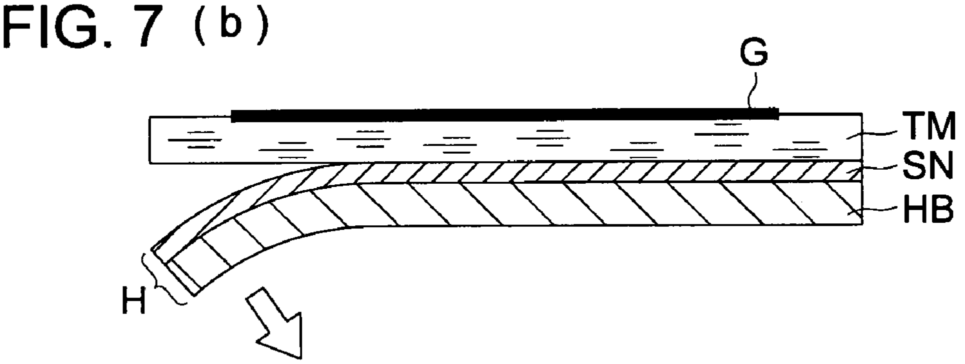
Figure 7:
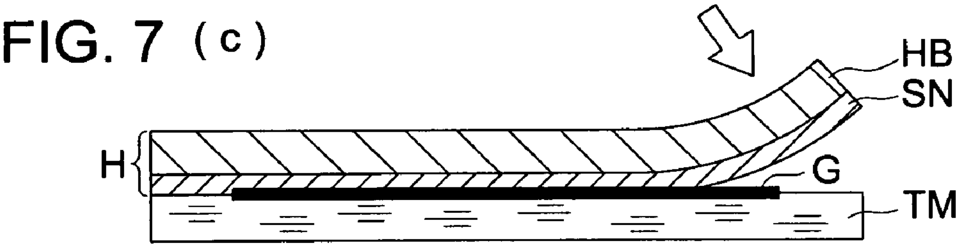
Figure 7:
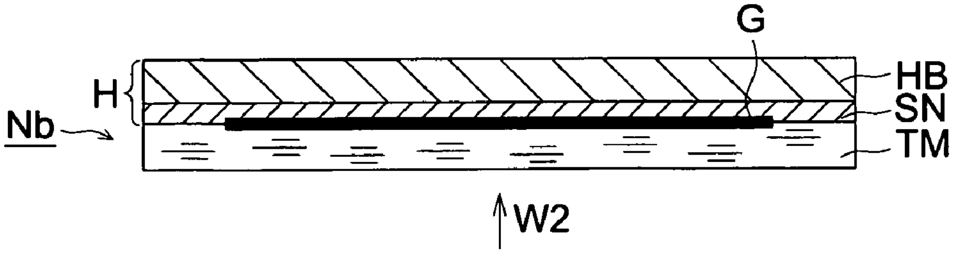
Figure 8:
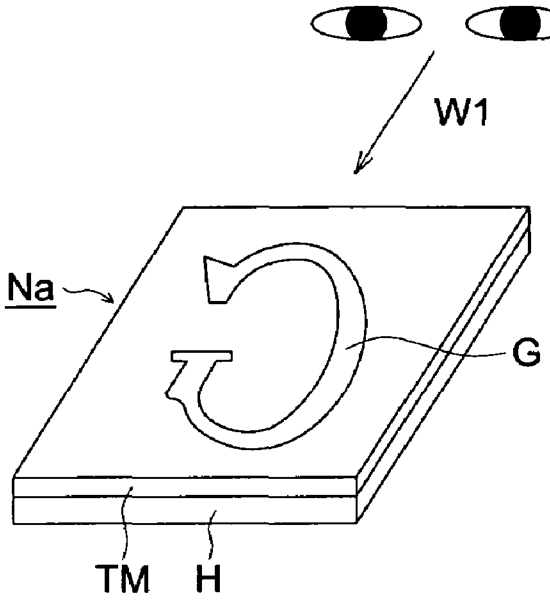
FIGS. 8(*a*) and (*b*) are diagrams showing the normal image and mirror image when the image is formed on the transparent sheet Na.
Figure 8:
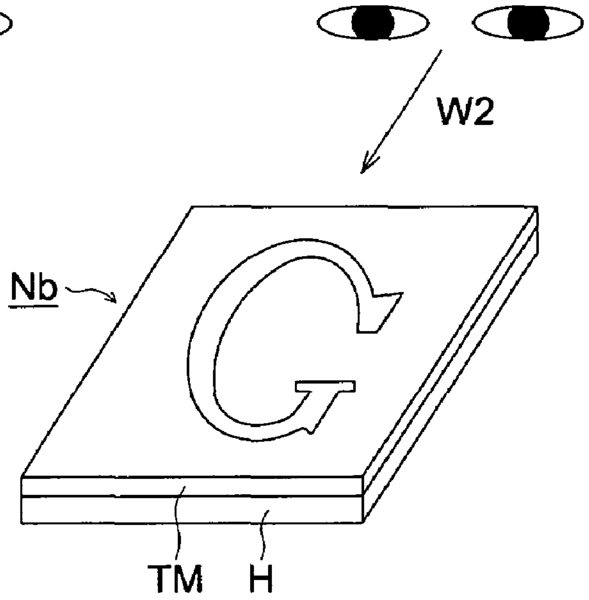

Referring to FIGS. 7(*a*) through 7(*d*), the following describes how an image is formed on the transparent sheet Na shown in FIG. 6. As shown in FIG. 7(*a*), the image G as a mirror image is formed on the first face of the transparent substrate TM. When viewed from W1 of FIG. 7(*a*), the image G is a mirror image reversed with respect to the normal image. FIG. 8(*a*) shows an image G formed on the transparent substrate TM. As shown in FIG. 7(*b*), the light reflecting member H is separated from the transparent substrate TM. As shown in FIG. 7(*c*), the adhesive layer SN is bonded to the first face of the transparent substrate TM carrying the image G. As shown in FIG. 7(*d*), the image G is produced in a form being sandwiched between the transparent substrate TM and light-reflecting pair H. When the image-formed transparent sheet Nb is viewed from W2 of FIG. 7(*d*), the normal image is observed. FIG. 8(*b*) shows the image G formed on the image-formed transparent sheet Nb.

Figure 9:
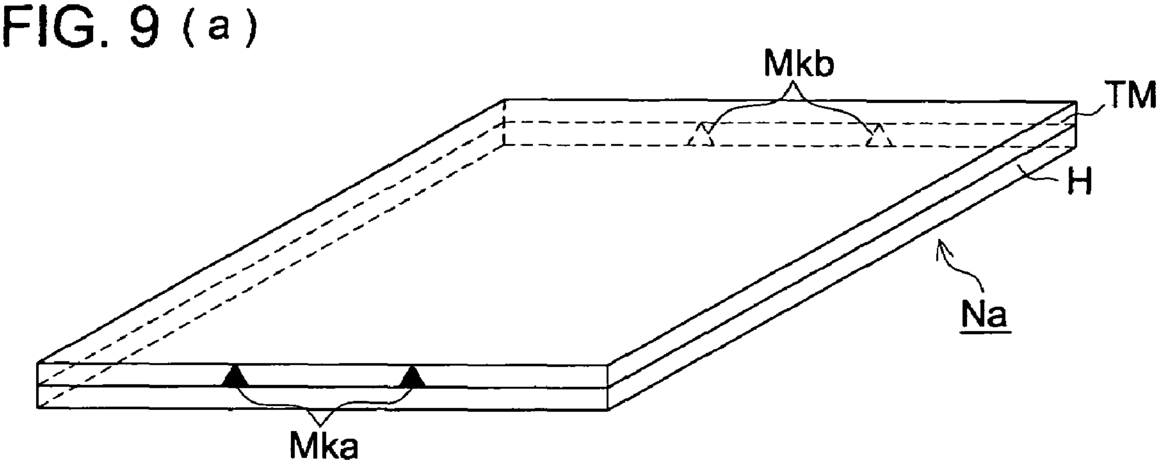
FIGS. 9(*a*) and (*b*) are explanatory diagrams showing the examples of separation and lamination steps.
Figure 9:
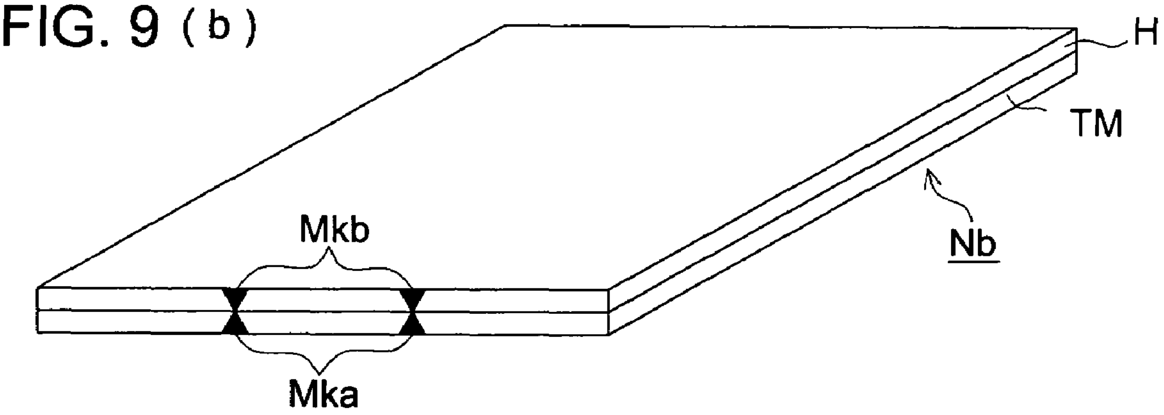

In the step shown in FIG. 7(*b*), the transparent substrate TM is separated from the light reflecting member H made up of adhesive or agglutinant layer SN and light reflecting member HB. This step is carried out after ejection from the image forming apparatus 1. Further, in the step given in FIG. 7(*c*), transparent substrate TM and light reflecting member H are bonded together after the transparent substrate TM has been reversed. This is also carried out after ejection from image forming apparatus 1. FIG. 9 shows the examples of separation and lamination steps. As shown in FIG. 9(*a*), a mark MKa for alignment is provided at the end of the transparent substrate TM constituting the transparent sheet Na. Further, a mark MKb for alignment is provided at the end opposite to the aforementioned end of the light reflecting member H. If the marks MKa and MKb are bonded together after alignment, the image-formed transparent sheet Nb can be produced, as shown in FIG. 9(*b*). The marks MKa and MKb are printed on the transparent substrate TM and light reflecting member H in advance.

The following describes the formation of a mirror image on the transparent sheet Na in the image forming apparatus 1. The formation of a mirror image on the transparent sheet Na must be set on the operation section 104.

Figure 10:
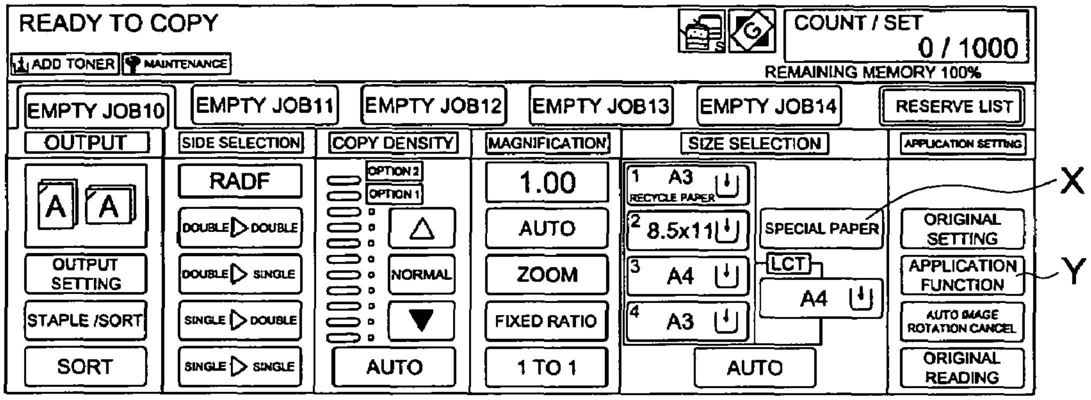
FIGS. 10(*a*) and (*b*) are explanatory diagrams representing the setting screen of the operation section 104.
Figure 10:
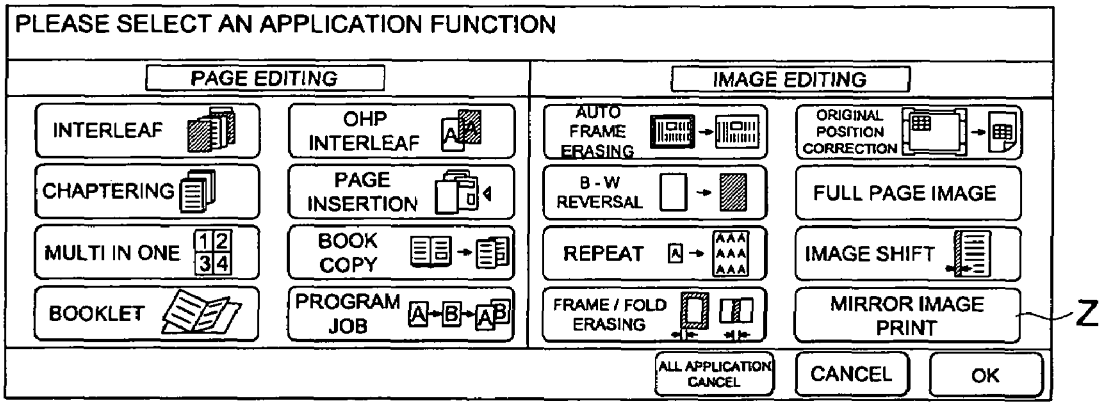

FIGS. 10(*a*) and 10(*b*) are explanatory diagrams showing the setting screen of the operation section 104.

FIG. 10(*a*) shows a basic setting screen. The single-/double-sided printing modes, copy density, magnification and output size can be set using a touch panel. To form an mirror image on the transparent sheet Na, the transparent sheet Na is set on the manual feed section 21 of the image forming apparatus 1 (FIG. 1). The "X" area of FIG. 10(*a*) is pressed to select the manual feed section 21. Then the "Y" area (application function) of FIG. 10(*a*) is pressed and the setting screen given in FIG. 10(*b*) appears. The "Z" area (mirror image print) of FIG. 10(*b*) is then pressed for selection. The setting operation has now completed. An mirror image is formed on the transparent sheet Na by pressing the Copy Start button after completion of the setting operation. The image forming step for forming the mirror image on the transparent sheet is basically the same as the normal image forming step, except that the image data writing operation in the exposure apparatus 430 (FIG. 1) is different. This will be described with reference to FIG. 11.

Figure 11:
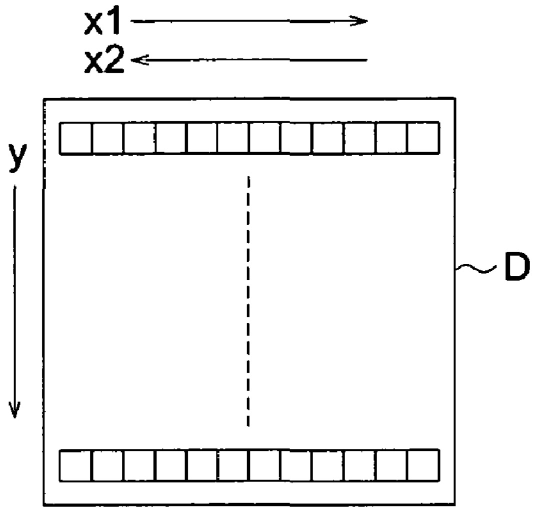
FIG. 11 is an explanatory diagram showing the order of writing the image data in the case of a mirror image.

FIG. 11 is an explanatory diagram showing the order of writing the image data in the case of a mirror image.

When a mirror image is formed on the transparent sheet, the read image processing section 101(FIG. 3) generates the image data so that the exposure apparatus 430 performs the writing operation in the order shown in FIG. 11. To be more specific, the output image processing section 103 performs image processing in such a way that the image data D is written in the order x2 reverse to the order x1 of the normal image in the main scanning direction, and in the same order y as that of the normal image in the sub-scanning direction. This results in a mirror image being formed on the photoreceptor. The mirror image having been formed on the photoreceptor 1 is changed into a normal image when it has been transferred onto the intermediate transfer belt. When it has been transferred onto he transparent sheet, it is again changed to the mirror image.

When a mirror image is formed on the transparent sheet, calibration must be performed in order to adjust the density and color tone. The mirror image formed on the transparent sheet Na described with reference to FIG. 6 can be observed through the transparent substrate TM of the transparent sheet Na. Thus, the density and color tone for the image seen through the transparent substrate TM must be adjusted to the appropriate level. Further, the image forming apparatus 1 allows a normal image to be formed on the standard paper, and a mirror image to be formed on the transparent sheet, depending on the mode selected by the user. When calibration is conducted to adjust the density and color tone, calibration for forming a normal image on the standard paper must be distinguished from that for forming a mirror image on the transparent sheet. Otherwise, wrong correction data for image formation may be used, and an image characterized by appropriate density and color tone cannot be produced. Thus, correct identification of the type of calibration is essential. Such being the case, the following describes the method for calibration with consideration given to the characteristics of the following transparent sheet, and the method for distinguishing the normal image calibration from mirror image calibration.

Figure 12:
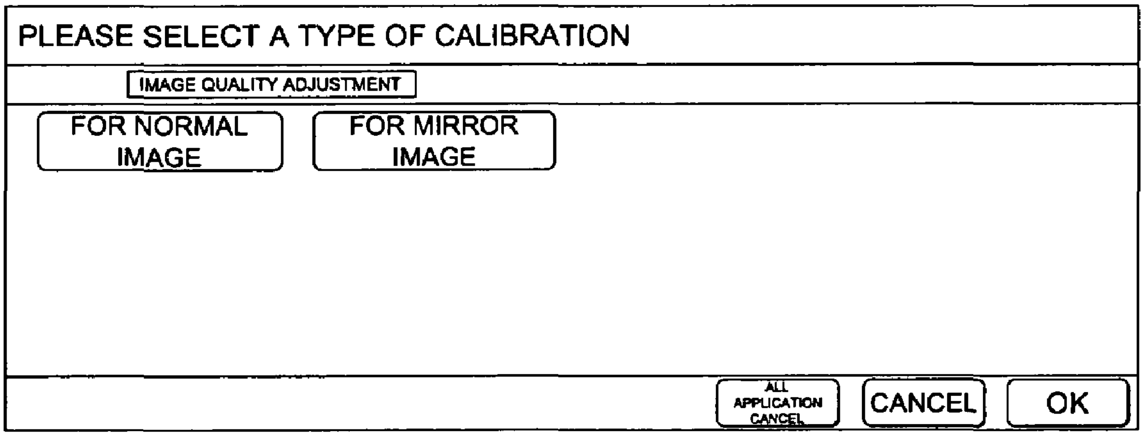
FIG. 12 is an explanatory diagram representing the calibration setting screen in the operation section 104.

FIG. 12 is an explanatory diagram representing the calibration setting screen in the operation section 104.

The operation section 104 is designed in a touch panel configuration. When calibration operation is selected on the basic screen, a calibration type setting screen will appear as shown in FIG. 12. When the normal image calibration is to be performed, the Normal Image area on the touch panel is pressed, and the OK button is then pressed. This procedure completes the setting operation. In the meantime, when the mirror image calibration is to be performed, the Mirror Image area on the touch panel is pressed, and the OK button is then pressed. This procedure completes the setting operation.

Figure 13:
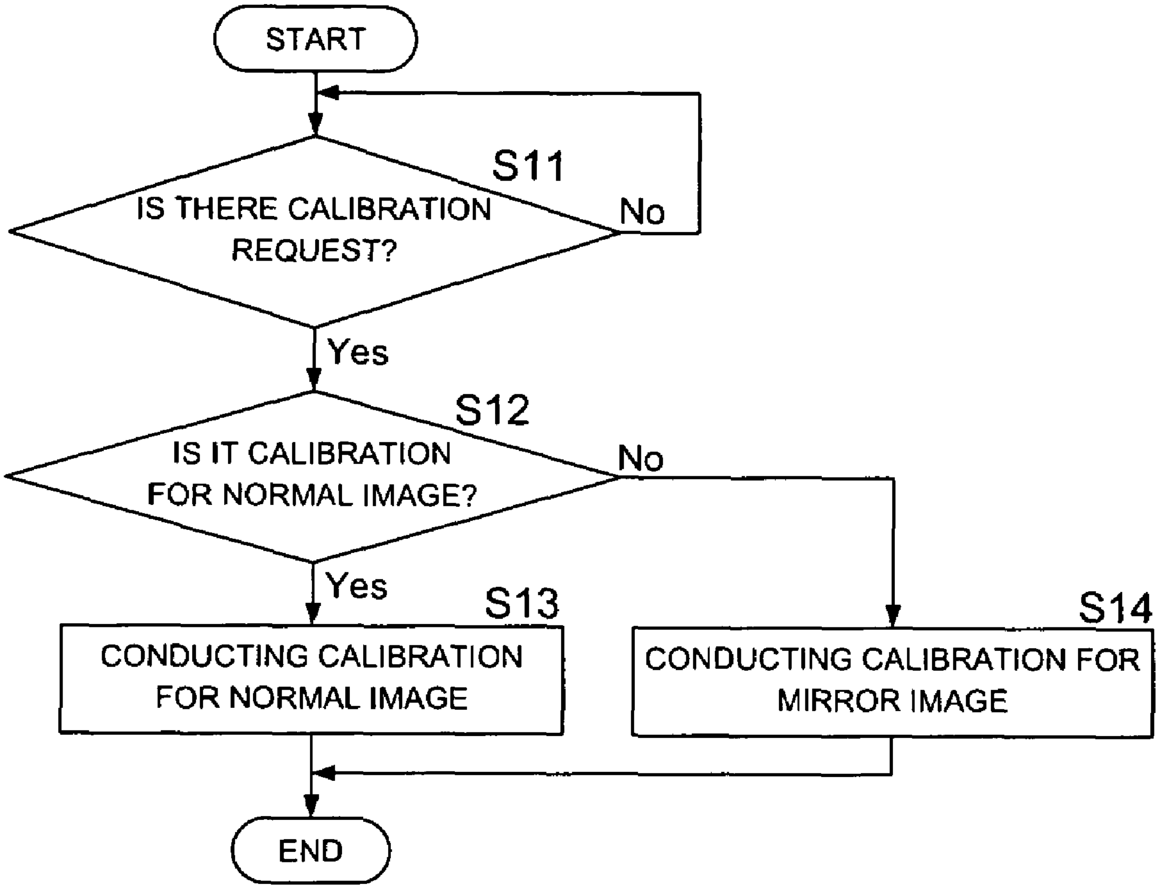
FIG. 13 is a flow chart representing the operations when setting the calculation type.

FIG. 13 is a flow chart representing the operations when setting the calibration type.

In the first place, a decision step is taken to check if calibration operation is required or not (S11). The decision is made depending on whether or not the user selects the calibration operation on the basic screen. When there is a request for calibration operation, a decision is made to see if normal image calibration has been requested or not (type determining step S12). This is done by checking if the Normal Image area on the touch panel has been pressed or not. If the Normal Image area on the touch panel has been pressed, and a decision has been made that normal image calibration is selected, normal image calibration operation is performed (S13). In the meantime, if the Mirror Image area on the touch panel has been pressed, and a decision has been made that normal image calibration is not selected, mirror image calibration operation is performed (S14). The operation details in S13 and S14 will be described with reference to FIG. 14 and FIG. 17.

Figure 14:
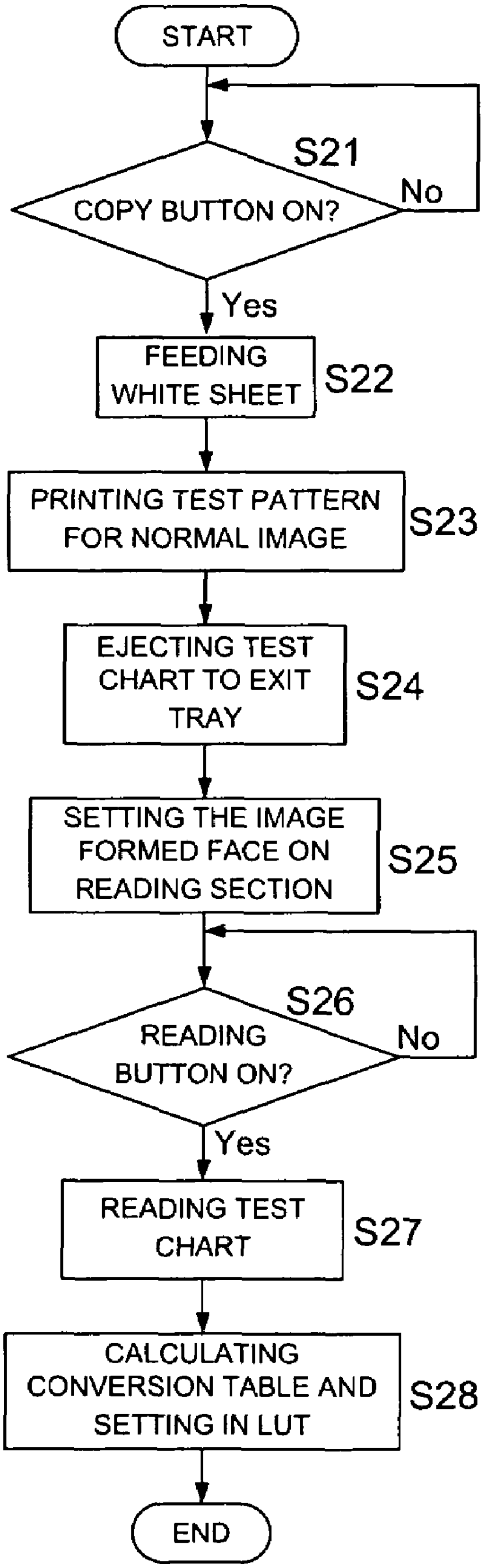
FIG. 14 is a flow chart representing the calibration operations for a normal image.

FIG. 14 is a flow chart representing the calibration operations for a normal image when setting the calibration type.

Figure 15:
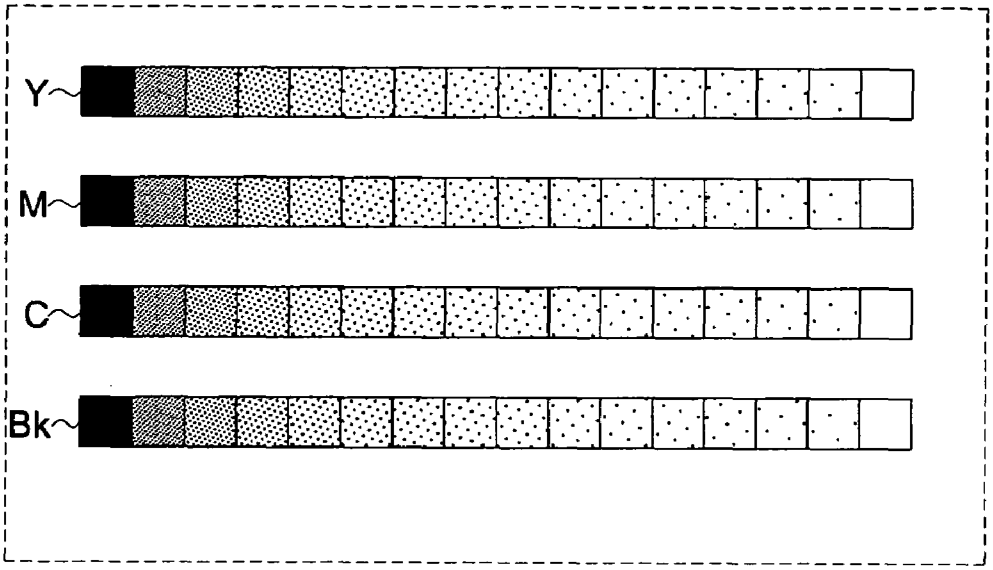
FIGS. 15(*a*) and (*b*) are explanatory diagrams representing the test patterns for normal image and mirror image.
Figure 15:
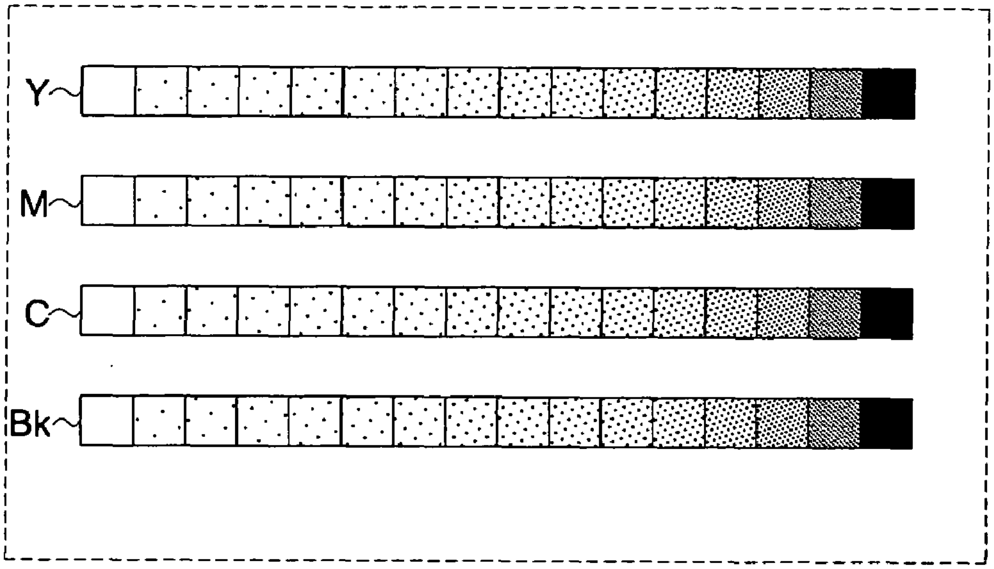
Figure 16:
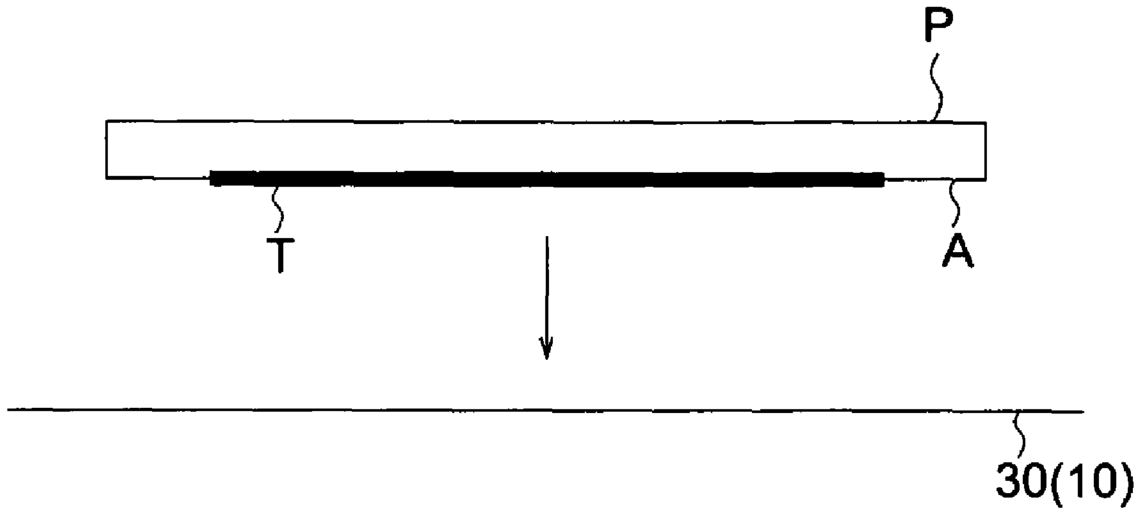
FIG. 16 is an explanatory diagram showing that the white paper with the normal image test pattern formed thereon is set on the reading section.

As described above, the Normal Image area is pressed and the OK button is pressed on the touch panel of the operation section 104. Then the setting operation completes. When the Copy button is pressed (S21), white paper as the standard paper is fed as the recording material (S22). The normal image test pattern is read from the ROM 108 in the image forming apparatus 1, and the normal image test pattern is printed on the white paper having been fed (image forming step S23). The normal image test pattern is shown in FIG. 15 (*a*). When the normal image test pattern has been printed, the printed sheet as a test chart is ejected to the exit tray (S24). The face of the white paper with the test pattern formed thereon is assumed by the user as the face to be read, and is set on the reading section 30 (densitometer or calorimeter 10 for the image forming system) (S25). Referring FIG. 16, the following describes how the white paper with the test pattern formed thereon is set on the reading section. The normal image test pattern T is formed on the white paper P. As shown in FIG. 16, the face with the test pattern T formed thereon (side A in FIG. 16) is assumed as the face to be read and this is set on the reading section 30 (calorimeter 10 in the case of the image forming system). A decision step is taken to determine whether or not the Read button has been pressed (S26). If the Read button has been pressed, reading of the test chart will start (reading step S27). Based on the information having been read, density correction data is determined so that the density data on the test pattern is converged on the target data. The conversion table for calibration is calculated for each color component, and the result is set on the density conversion LUT (correction data determining step S28). Thus, an image having an appropriate density is formed by a series of these operations. It is also possible to make such arrangements that an image having an appropriate color tone can be formed using the color conversion LUT 102—not a density correction LUT—for the items to be calibrated.

Figure 17:
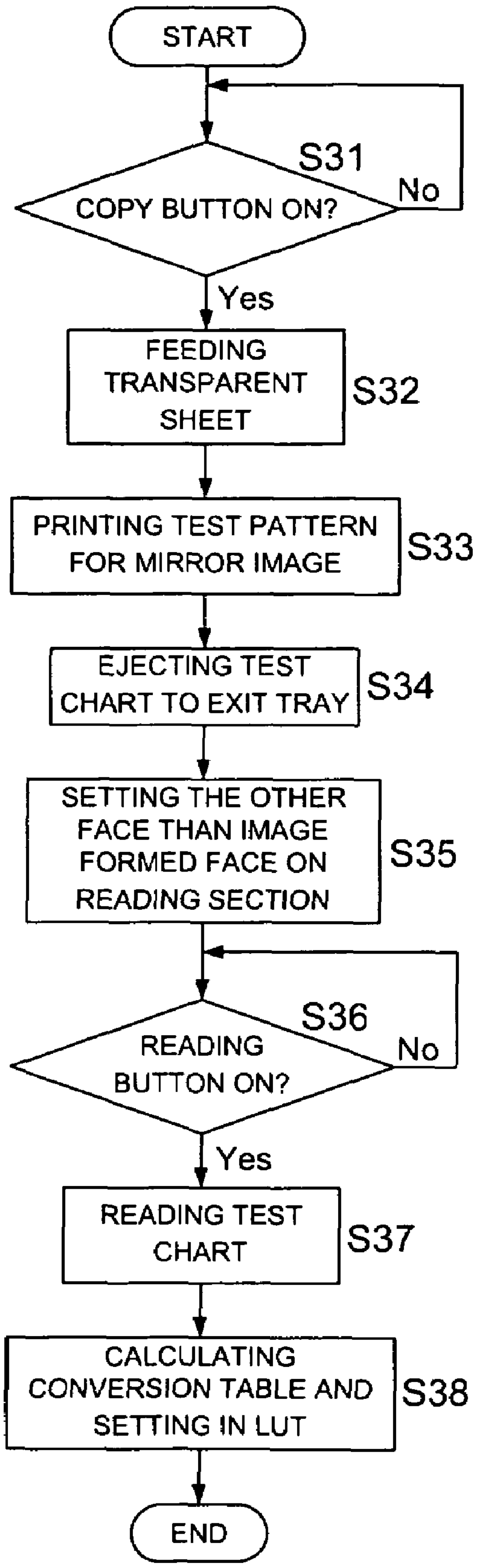
FIG. 17 is a flow chart showing the calibration operation for mirror image.
Figure 18:
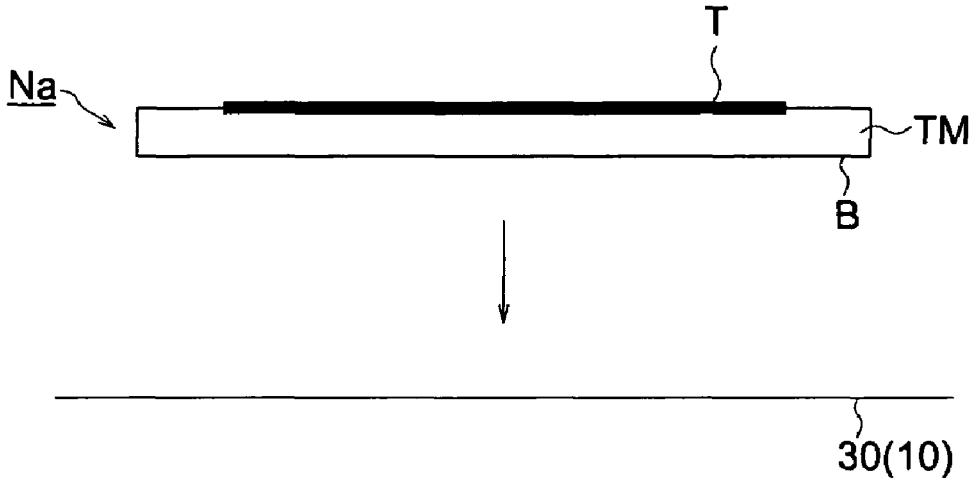
FIGS. 18(*a*) and (*b*) are explanatory diagrams representing that the transparent sheet with the mirror image test pattern formed thereon is set on the reading section.
Figure 18:
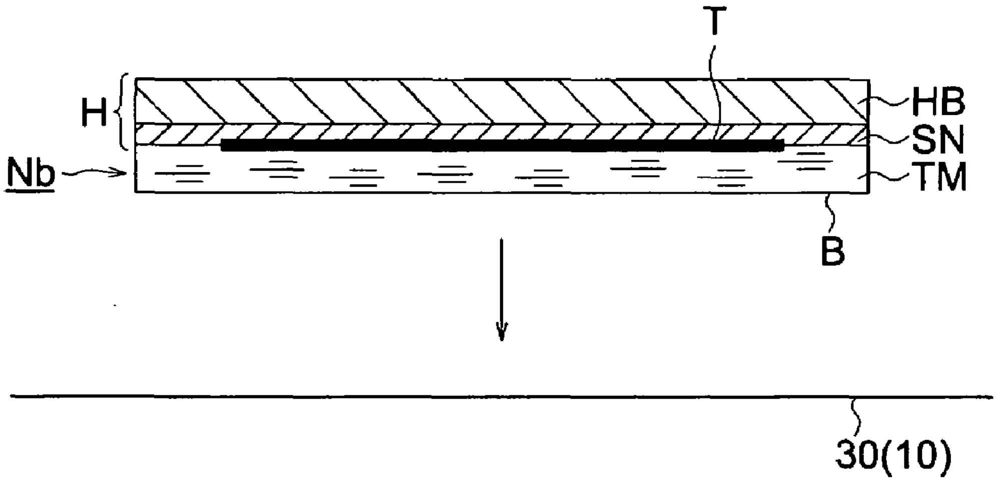

FIG. 17 is a flow chart showing the calibration operation for mirror image;

As described above, the Mirror Image area on the touch panel of the operation section 104 is pressed and the OK button is then pressed. Setting operation now completes. When the Copy button has been pressed (S31), transparent sheets are fed as recording materials (S32). The transparent sheet is set on the manual feed section 21. The mirror image test pattern is read from the ROM 108 in the image forming apparatus 1, and the mirror image test pattern is printed on the transparent sheet having been fed (image forming step S33). A mirror image test pattern is shown in FIG. 15(*b*). When the mirror image test pattern has been printed, the test chart as the printed sheet thereof is ejected to the exit tray (S34). The face where the test pattern in the transparent sheet is not formed is assumed by the user as the face to be read, and is set on the reading section 30 (calorimeter 10 in the case of the image forming system) (S35). Referring to FIGS. 18(*a*),(*b*), the following describes how the transparent sheet with the test pattern formed thereon is set on the reading section. FIG. 18(*a*) shows that mirror image test pattern T is formed on the transparent sheet Na made of a transparent substrate TM alone. FIG. 18 (*b*) shows a sheet Nb in which the test pattern T is formed on the transparent sheet Na shown in FIG. 6. If the mirror image test pattern T is formed on the transparent sheet Na composed of only the transparent substrate TM shown in FIG. 18(*a*), the face without the test pattern formed thereon (surface B in FIG. 18(*a*)) is assumed as the face to be read and is set on the reading section 30 (the densitometer or calorimeter 10 in the case of image forming system). When the mirror image test pattern T is formed on the transparent sheet Na shown in FIG. 18(*b*), the face without the test pattern T of the transparent substrate TM being formed thereon (surface B in FIG. 18(*b*)) is assumed as the face to be read, and is set on the reading section 30 (calorimeter 10 in the case of image forming system). A decision step is taken to determine whether or not the Read button has been pressed (S36). If the Read button has been pressed, reading of the test chart will start (reading step S37). Based on the information having been read, density correction data is determined so that the density data on the test pattern is converged on the target data. The conversion table for calibration is calculated for each color component, and the result is set on the density correction LUT (correction data determining step S38). Thus, a mirror image having an appropriate density is formed by a series of these operations. It is also possible to make such arrangements in the mirror image calibration that an image having an appropriate color tone can be formed using the color conversion LUT 102—not a density correction LUT—for the items to be calibrated.

As described above, for the mirror image formed on the transparent sheet Na, the calorimetric data of the image is corrected through the transparent substrate TM of the transparent sheet Na. This arrangement allows the calibration operation to be performed, with consideration given to the characteristics of the transparent sheet. Thus, the mirror image characterized by appropriate density and color tone can be formed on the transparent sheet. Further, since adequate implementation of calibration is ensured by the user setting the calibration type of normal image or mirror image, there is no possibility of allowing wrong correction data for image formation to be taken. Thus, this method ensures formation of an image characterized by appropriate density and color tone.

The calibration program for causing the aforementioned calibration operation to be performed by the image forming apparatus 1 and image forming system 1A is stored in the ROM 108.

The normal image test pattern and mirror image test pattern having been described in FIGS. 15 and 17 are stored in the ROM 108. When they are read from the ROM 108, normal image calibration operation and mirror image calibration operation are performed. Further, only the normal image test pattern is stored in the ROM 108, without a mirror image test pattern being provided. In the case of mirror image calibration, the test pattern is read from the ROM 108 and is reversed in the main scanning direction. The mirror image test pattern is outputted from the image processing section. This arrangement permits both types of calibration to be performed. Further, only the normal image test pattern is stored in the ROM 108, without a mirror image test pattern being provided. In the case of normal image calibration as well as in the mirror image calibration, the test pattern is outputted. For the mirror image calibration, the reading operation in the reading section 30 (colorimeter 10 for the image forming system) is reversed in the main scanning direction. This arrangement also ensures both types of calibration to be performed.

Incidentally, in the normal image calibration, the face of the standard paper such as white paper with the test pattern formed thereon must be assumed as the face to be read; whereas, in the mirror image calibration, the face of the transparent paper without the test pattern formed thereon must be assumed as the face to be read. The test pattern in the standard paper such as white paper is not visible through the paper. This allows the user to easily identify the face to be read. However, the test pattern on the transparent sheet may be visible from both faces of the transparent sheet. This makes it difficult for the user to determine which face is the face to be read. The image forming section 40 or image forming apparatus 1 is controlled by the CPU (control section) 107, in such a way that an identification mark is formed on the recording material to determine which face of the recording material with the test pattern formed thereon is the face to be read.

Figure 19:
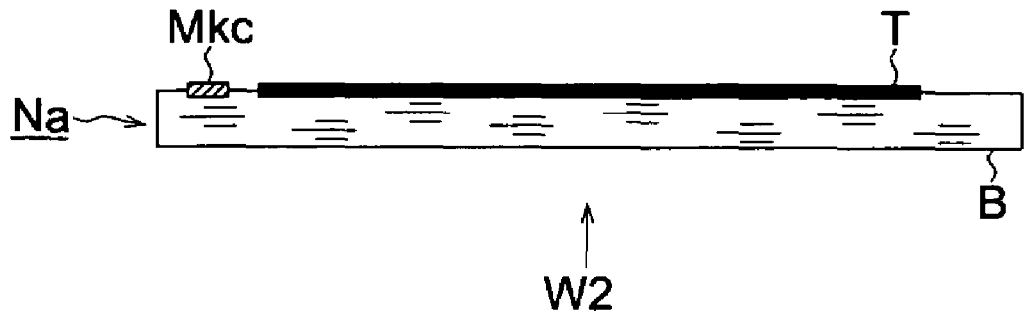
FIGS. 19(*a*) and (*b*) are explanatory diagrams representing the identification mark MKc for identifying the face to be read.
Figure 19:
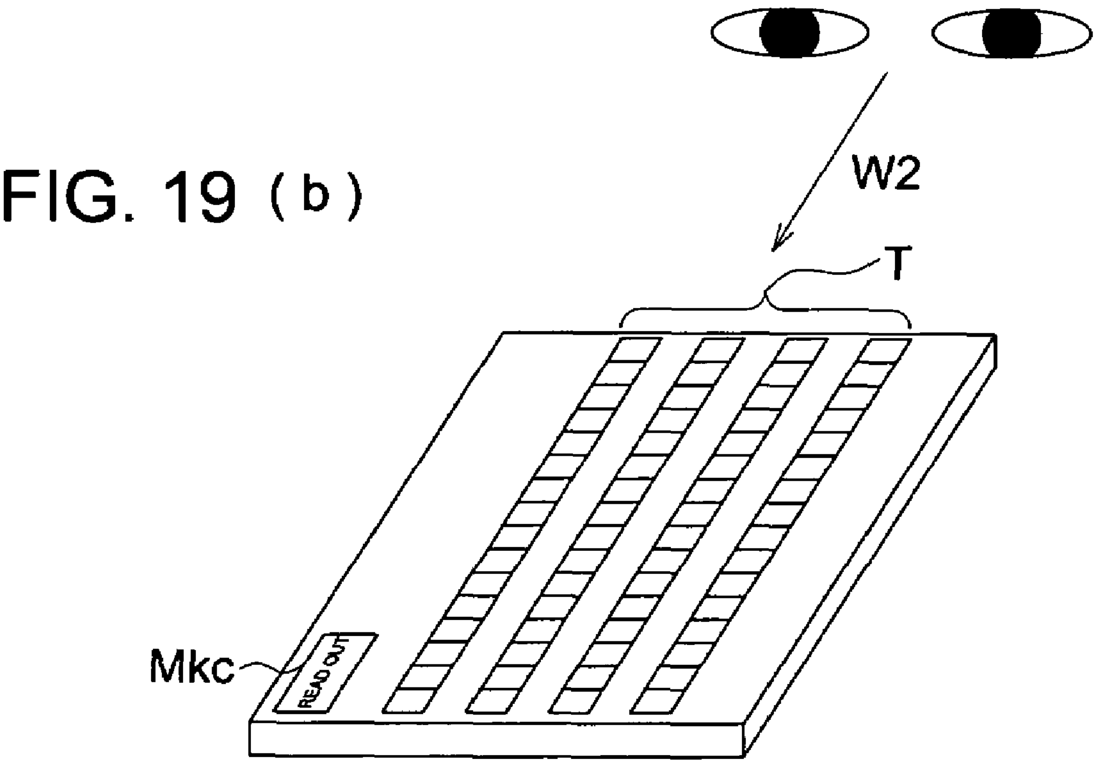

FIGS. 19(*a*) and (*b*) are explanatory diagrams representing the identification mark MKc for identifying the face to be read.

FIG. 19(*a*) shows that the test pattern T and identification mark MKc are formed on the transparent sheet Na. The test pattern T shown in FIG. 19(*a*) is a test pattern for mirror image. When calibration is to be conducted using the transparent sheet Na, the surface B must be the face to be read. Thus, the identification mark MKc is used to notify the user that the surface B is the face to be read. FIG. 19(*b*) shows the test chart T and identification mark MKc as the transparent sheet Na is viewed from the W2. For example, the character "READ OUT" is employed as the identification mark MKc. If the character is used as an identification mark MKc, the face that permits correct reading of the character can be easily identified as the face to be read. In FIG. 19(*b*), a character is used as an identification mark, but any other mark can provide the same advantage if it indicates which face of the recording material is the face to be read. The identification mark MKc is stored in the ROM 108. The CPU 107 provides control in such a way that, when the test pattern is outputted, the identification mark MKc is also outputted. As described above, the identification mark MKc formed on the recording material provides easy identification to show which face of the recording material wherein the test pattern is formed is the face to be read by a scanner and others. This arrangement ensures appropriate calibration operation.

Figure 20:
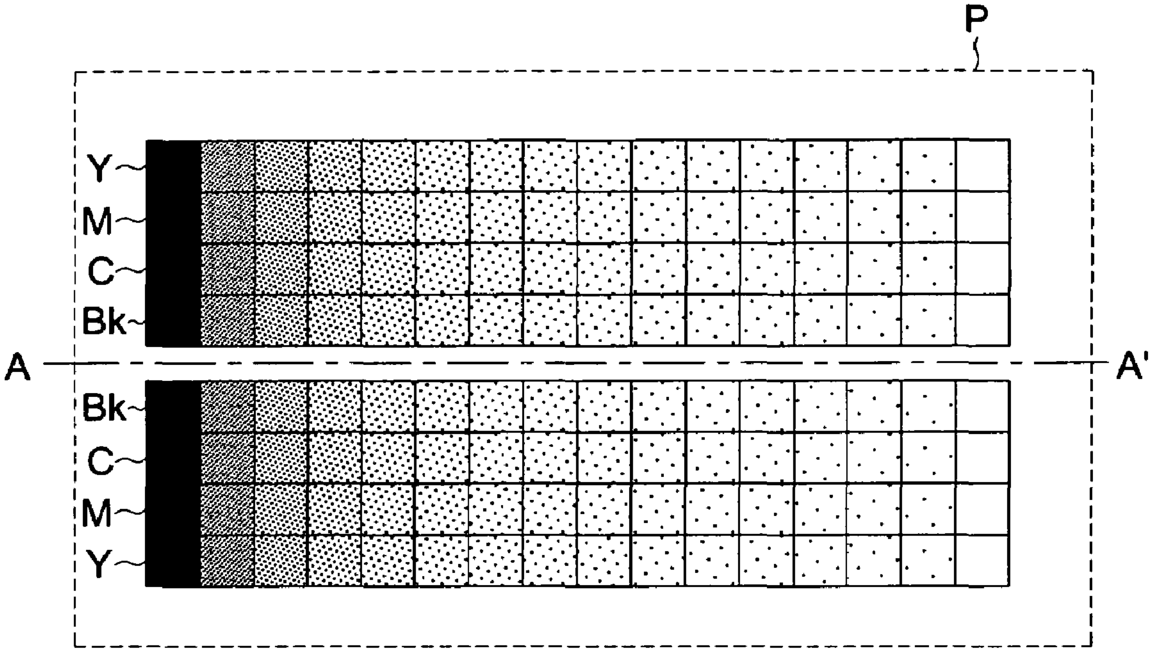
FIG. 20 is an explanatory diagram representing an example of the test pattern having line symmetry.

FIG. 20 is an explanatory diagram representing an example of the test pattern having line symmetry.

The test pattern shown in FIG. 20 represents a 8-tiered strip pattern. The patch color located on the topmost tier is Y, the patch color on the second tier from the top is M, the patch color on the third tier from the top is C, and the patch color on the fourth tier from the top is Bk. The density of each color is reduced as one goes from left to right. Further, line symmetry is observed with respect to the boundary line A-A'. Such a test pattern can be used for both normal image calibration and mirror image calibration. Without a pattern provided for normal image calibration and another pattern for mirror image calibration, one pattern can be used for both the normal image calibration and mirror image calibration. This arrangement reduces the kind of the test patterns to be stored in the image forming apparatus 1, hence reduces the storage capacity of the image forming apparatus 1 and others. A test pattern of line symmetry in the vertical direction is given in FIG. 20. The same advantages can also be provided by a test pattern of line symmetry in the horizontal direction. Further, the same advantages can also be provided by the test pattern of line symmetry in addition to point symmetry (e.g. a pattern on a concentric circle).

What is claimed is:

1. A calibration method comprising:

forming a test image on a sheet;

reading the test image on the sheet;

wherein in a case where a first test image is formed in the forming step on a first face of a transparent sheet as the test image, the first test image is read in the reading step from a second face of the transparent sheet which is opposite to the first face of the transparent sheet; and determining correction data to converge data of the test image onto target data based on information of the first test image read from the second face of the transparent sheet.

2. A calibration method of claim 1, wherein in a case where a second test image, which is in mirror image relation to the first test image, is formed in the forming step on a first face of the sheet as the test image, the second test image is read in the reading step from the first face of the sheet, and correction data is also determined based on information of the second test image read from the first face of the sheet.

3. An image forming system comprising:

an image forming apparatus for forming a test image on a sheet;

a reading apparatus for reading the test image formed on the sheet; and a control section for performing calibration operation according to the calibration method of claim 1, wherein the control section allows the image forming apparatus to perform the forming step, and allows the reading apparatus to perform the reading step.

4. A computer readable medium having stored thereon a calibration program which causes an image forming system to execute a calibration operation such that data of a test image formed on a transparent sheet are converged onto target data, wherein the image forming system comprises an image forming apparatus to form a test image on the transparent sheet, and a reading apparatus, connected to the image forming apparatus, to read the test image formed on the transparent sheet, and wherein the calibration program causes the image forming system to execute:

forming a test image on a first face of the transparent sheet;

reading the test image from a second face of the transparent sheet which is opposite to the first face of the transparent sheet; and determining correction data to converge data of the test image onto the target data based on information of the test image read from the second face of the transparent sheet in the step of reading the test image.

5. An image forming apparatus comprising:

an image forming section for forming a test image on a sheet;

a reading section for reading the test image formed on the sheet; and a control section for performing a calibration operation according to the calibration method of claim 1, wherein the control section allows the image forming section to perform the forming step, and allows the reading section to perform the reading step.

6. A computer readable medium having stored thereon a calibration program which causes an image forming apparatus to execute calibration operation such that data of a test image formed on a transparent sheet are converged onto target data, wherein the image forming apparatus comprises an image forming section to form a test image on the transparent sheet, and a reading section to read the test image formed on the transparent sheet, and wherein the calibration program causes the image forming system to execute:

forming a test image on a first face of the transparent sheet;

reading the test image from a second face of the transparent sheet which is opposite to the first face of the transparent sheet; and determining correction data to converge data of the test image onto the target data based on information of the test image read from the second face of the transparent sheet in the reading step.

7. A calibration method comprising:

determining a type of calibration to specify a normal image calibration or a mirror image calibration;

forming a test image on a first face of a sheet;

reading, when the normal image calibration is determined in the determining step, the test image from the first face of the sheet, and reading, when the mirror image calibration is determined in the determining step, the test image from a second face which is opposite the first face of the sheet on which the test image is formed; and determining correction data to converge data of the test image onto target data based on the information read in the reading step, wherein for the normal image calibration, the correction data is determined based on the information of the test image read from the first face of the sheet, and for the mirror image calibration, the correction data is determined based on the information of the test image read from the second face of the sheet.

8. The calibration method of claim 7, wherein in a case of the normal image calibration, a test image of normal image is used, and in a case of the mirror image calibration, a test image of mirror image is used in the forming step.

9. An image forming system comprising:

an image forming apparatus for forming a test image on a sheet;

a reading apparatus for reading the test image formed on the sheet; and a control section for performing a calibration operation according to the calibration method of claim 7, wherein the control section allows the image forming apparatus to perform the forming step, and allows the reading apparatus to perform the reading step.

10. A computer readable medium having stored thereon a calibration program which causes an image forming system to execute a calibration operation such that data of a test image formed on a sheet are converged onto target data, wherein the image forming system comprises an image forming apparatus to form a test image on the sheet, and a reading apparatus, connected to the image forming apparatus, to read the test image formed on the sheet, and wherein the calibration program causes the image forming system to execute:

determining a type of calibration to specify a normal image calibration or a mirror image calibration;

forming a test image on a first face of a sheet;

reading, when the normal image calibration is determined in the determining step, the test image from the first face of the sheet, and reading, when the mirror image calibration is determined in the determining step, the test image from a second face of the sheet which is opposite the first face of the sheet on which the test image is formed; and determining correction data to converge the data of the test image onto the target data based on information read in the reading step, wherein for the normal image calibration, the correction data is determined based on the information of the test image read from the first face of the sheet, and for the mirror image calibration, the correction data is determined based on the information of the test image read from the second face of the sheet.

11. An image forming apparatus comprising:

an image forming section for forming a test image on a sheet;

a reading section for reading the test image formed on the sheet; and a control section for performing a calibration operation according to the calibration method of claim 7, wherein the control section allows the image forming section to perform the forming step, and allows the reading section to perform the reading step.

12. A computer readable medium having stored thereon a calibration program which causes an image forming apparatus to execute a calibration operation such that data of a test image formed on a sheet are converged onto target data, wherein the image forming apparatus comprises an image forming section to form a test image on the sheet, and a reading section to read the test image formed on the sheet, and wherein the calibration program causes the image forming system to execute:

determining a type of calibration to specify a normal image calibration or a mirror image calibration;

forming a test image on a first face of a sheet;

reading, when the normal image calibration is determined in the determining step, the test image from the first face of the sheet, and reading, when the mirror image calibration is determined in the determining step, the test image from a second face which is opposite the first face of the sheet on which the test image is formed; and determining correction data to converge the data of the test image onto the target data based on information read in the reading step, wherein for the normal image calibration, the correction data is determined based on the information of the test image read from the first face of the sheet, and for the mirror image calibration, the correction data is determined based on the information of the test image read from the second face of the sheet.

13. The image forming system of claim 9, wherein the control section controls the image forming apparatus to form on the sheet an identification mark to specify which face of the sheet, on which the test image has been formed, is a face to be read by the reading apparatus.

14. The image forming apparatus of claim 11, wherein the control section controls the image forming section to form on the sheet an identification mark to specify which face of the sheet, on which the test image has been formed, is a face to be read by the reading section.

15. The image forming system of claim 9, wherein the test image has a pattern of line symmetry and is used in both the calibration operation for normal image and the calibration operation for mirror image.

16. The image forming system of claim 15, wherein the control section controls the image forming apparatus to form on the sheet an identification mark to specify which face of the sheet, on which the test image has been formed, is a face to be read by the reading apparatus.

17. The image forming apparatus of claim 11, wherein the test image has a pattern of line symmetry and is used in both the calibration operation for normal image and the calibration operation for mirror image.

18. The image forming apparatus of claim 17, wherein the control section controls the image forming section to form on the sheet an identification mark to specify which face of the sheet, on which the test image has been formed, is a face to be read by the reading section.

* * * * *